(12) United States Patent
Liu

(10) Patent No.: US 7,822,075 B2
(45) Date of Patent: Oct. 26, 2010

(54) METHOD AND SYSTEM OF SIGNAL TRANSMISSION IN BASE TRANSCEIVER STATION BASED ON REMOTE RADIO HEAD

(75) Inventor: Sheng Liu, Guangdong (CN)

(73) Assignee: Utstarcom Telecom Co., Ltd., Hangzhou, Zhejiang (CN)

( * ) Notice: Subject to any disclaimer, the term of this patent is extended or adjusted under 35 U.S.C. 154(b) by 1029 days.

(21) Appl. No.: 11/547,699

(22) PCT Filed: Apr. 9, 2004

(86) PCT No.: PCT/CN2004/000335

§ 371 (c)(1),
(2), (4) Date: Nov. 1, 2006

(87) PCT Pub. No.: WO2005/099282

PCT Pub. Date: Oct. 20, 2005

(65) Prior Publication Data

US 2007/0195832 A1    Aug. 23, 2007

(51) Int. Cl.
H04J 3/02    (2006.01)
(52) U.S. Cl. ..................................... 370/539; 370/476
(58) Field of Classification Search .................. 370/539, 370/907, 328, 537, 466, 467, 470, 476, 474, 370/465
See application file for complete search history.

(56) References Cited

U.S. PATENT DOCUMENTS

| | | |
|---|---|---|
| 5,621,786 A | 4/1997 | Fischer et al. |
| 5,627,879 A | 5/1997 | Russell et al. |
| 5,642,405 A | 6/1997 | Fischer et al. |
| 5,644,622 A | 7/1997 | Russell et al. |
| 5,657,374 A | 8/1997 | Russell et al. |
| 5,852,651 A | 12/1998 | Fischer et al. |

(Continued)

FOREIGN PATENT DOCUMENTS

JP    2002-176452    6/2002

(Continued)

OTHER PUBLICATIONS

Office Action dated Feb. 12, 2010 in corresponding JP Application No. 2007-506638 with English translation.

*Primary Examiner*—Brian D Nguyen
(74) *Attorney, Agent, or Firm*—Harness, Dickey & Pierce, P.L.C.

(57) ABSTRACT

The invention relates to a method of signal transmission between a host BTS and Remote Radio Unit(s), and the BTS communication system thereof. The transmission channel between the host BTS and the Remote Radio Unit(s) uses wideband transmission links or a network, the method includes the following steps of: performing the transmission over the transmission channel using a Synchronous Digital Hierarchy (SDH)/Optical Transmission Network (OTN), forming a digital wireless signal data stream and an in-band control signaling stream transmitted over the transmission channel into a Generic Framing Procedure (GFP) frame which is further mapped to a STM-N/OTM-n frame, thereby multiplexing the digital wireless signal data stream and the in-band control signaling stream to realize SDH/OTN-based transmission. As a result, the wireless signal can be effectively transmitted between the RRH and the host BTS without specific transmission network, and the management and maintenance operation required by the signal transmission and the networking cost can be reduced.

75 Claims, 10 Drawing Sheets

U.S. PATENT DOCUMENTS

| | | | |
|---|---|---|---|
| 6,016,426 A | 1/2000 | Bodell | |
| 6,324,391 B1 | 11/2001 | Bodell | |
| 2004/0004943 A1 | 1/2004 | Kim et al. | |
| 2005/0143131 A1* | 6/2005 | Gish et al. | 455/561 |
| 2005/0216783 A1* | 9/2005 | Sundaram et al. | 714/4 |
| 2005/0220096 A1* | 10/2005 | Friskney et al. | 370/389 |
| 2007/0019653 A1* | 1/2007 | Bolle et al. | 370/395.51 |

FOREIGN PATENT DOCUMENTS

| | | |
|---|---|---|
| JP | 2003-032234 | 1/2003 |
| JP | 2004-40802 | 2/2004 |
| JP | 2004-048210 | 2/2004 |

* cited by examiner

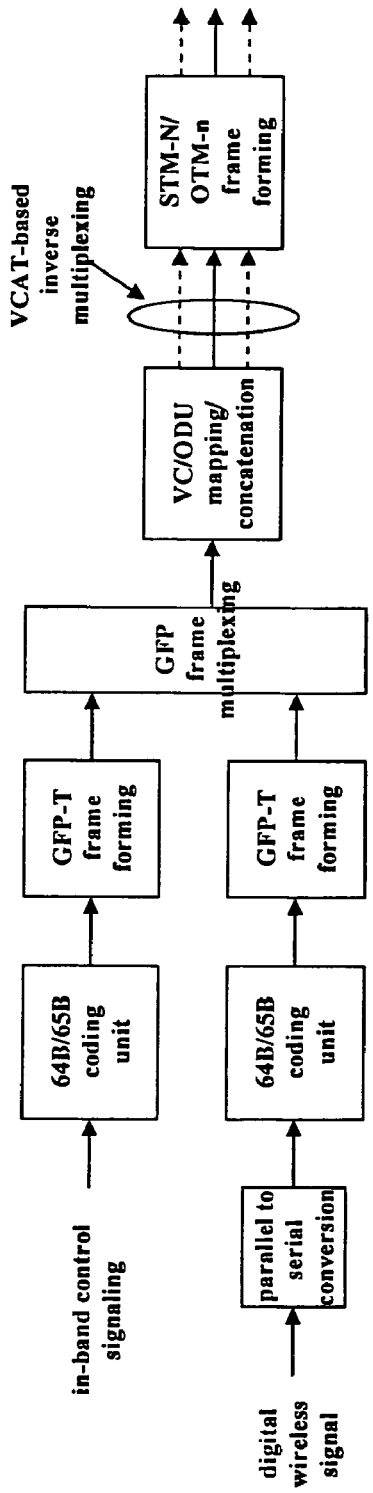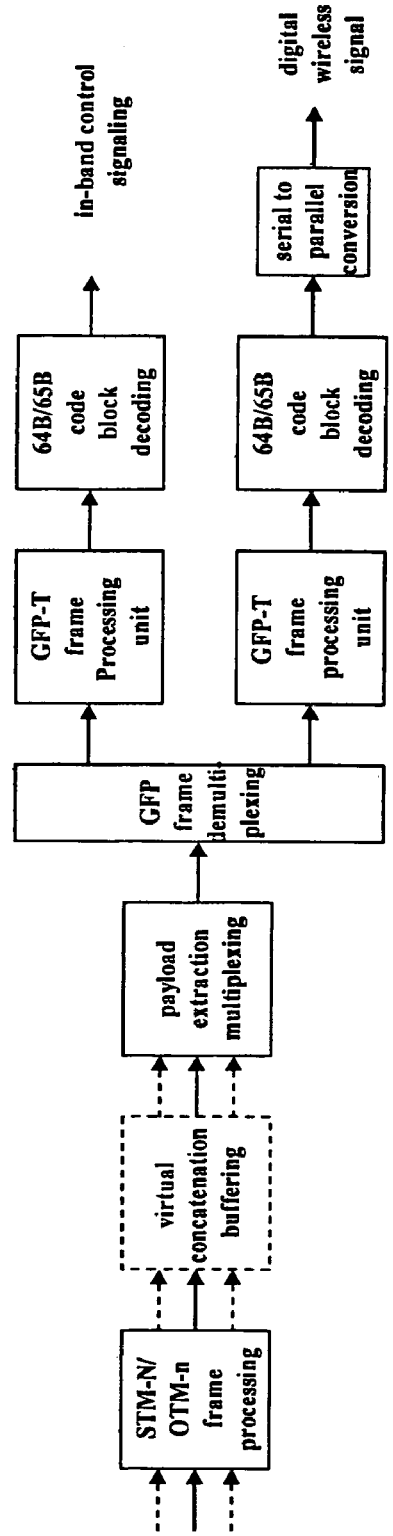
FIG. 7A
FIG. 7B

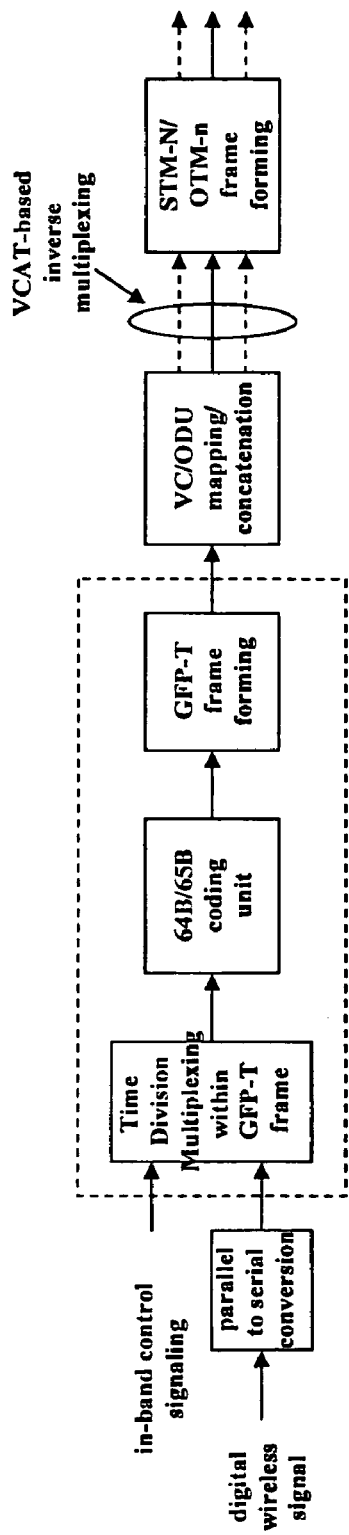
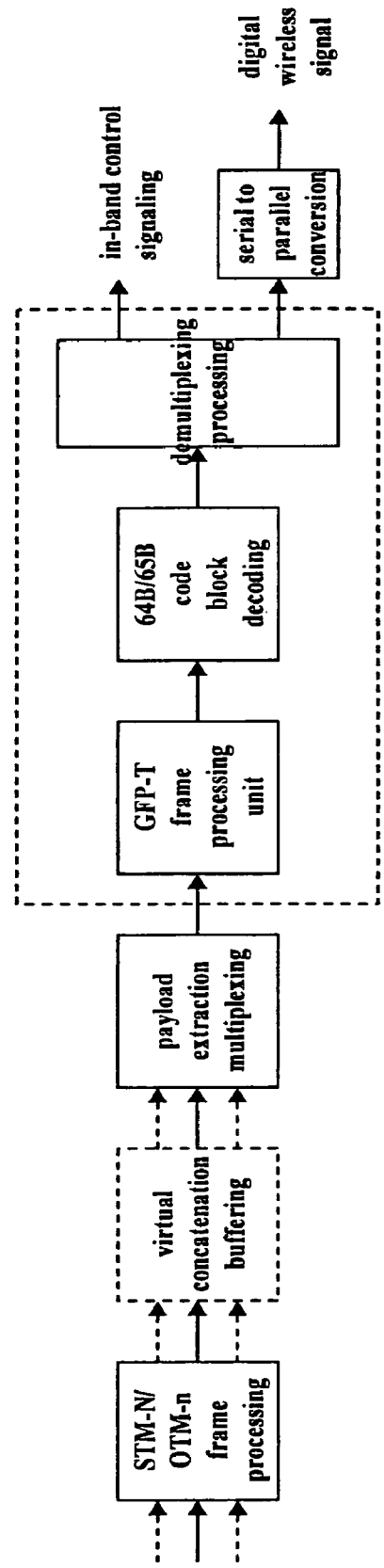
FIG. 8A
FIG. 8B

METHOD AND SYSTEM OF SIGNAL TRANSMISSION IN BASE TRANSCEIVER STATION BASED ON REMOTE RADIO HEAD

FIELD OF THE INVENTION

The present invention relates to a Base Transceiver Station technology used in mobile communication system, and more particularly, to a method and system of signal transmission in the Base Transceiver Station system using remote radio head (RRH) technology.

BACKGROUND OF THE INVENTION

1. Remote Radio Head (RRH) Technology, Centralized Base Transceiver Station (CBTS) and Signal Transmission As illustrated in FIG. 1A, in mobile communication systems, wireless access network is typically composed of Base Transceiver Stations (BTSs) and Base Station Controllers (BSCs) or Radio Network Controllers (RNCs) for controlling a plurality of BTSs. Wherein the BTS is mainly composed of a baseband processing subsystem, a radio frequency (RF) subsystem, and an antenna etc and is responsible for transmitting, receiving, and processing wireless signal. A BTS can cover various cells by means of a plurality of antennas, as illustrated in FIG. 1B.

In mobile communication systems, there are wireless network coverage problems that are more difficult to solve with conventional BTS technologies, such as, indoor coverage of high-rise buildings, coverage hole, or the coverage of shadow zone, RRH technology is a more effective solution being proposed to solve the above problems. In the BTS system using RRH technology, the primary radio frequency units and antennas are installed in regions that are required to provide coverage, and are connected to other units in the BTS through wideband transmission lines.

This technology can be further developed to a CBTS technology that uses RRH technology. Compared with the conventional BTS, the CBTS using RRH technology has many advantages: the centralized structure allows to use several Micro-Cells to replace a Macro-Cell based on the conventional BTS, therefore it can be adapted to various wireless environment better, and enhance wireless performances such as system capacity and coverage etc; the centralized structure enables the replacement of soft handoff in the conventional BTS by softer handoff, therefore obtains additional processing gain; the centralized structure also enables valuable baseband signal processing resources to become a resource pool shared by several cells, therefore has the advantage of Statistic Multiplex, and also decreases system cost. The following patents disclose some implementation details about the CBTS using RRH technology, they are: U.S. Pat. No. 5,657,374, filed on Mar. 23, 1995, entitled "Cellular system with centralized base stations and distributed antenna units", and U.S. Pat. No. 6,324,391, filed on Jun. 28, 1999, "Cellular communication with centralized control and signal processing", which are hereby incorporated by reference.

As illustrated in FIG. 2, the CBTS system 200 using RRH technology is composed of a central channel processing subsystem 201 and a plurality of Remote Radio Units (RRUs) 2041, 2042, . . . , 204M installed integrately. They are connected to each other through wideband transmission links or network. The central channel processing subsystem 201 is mainly composed of functional units such as a channel processing resource pool 202 and a signal route distribution unit 203, etc. The channel processing resource pool 202 is formed by stacking a plurality of channel processing units 2021, 2022 . . . , 202N together and is used to perform base band signal processing, etc. The signal route distribution unit 203 dynamically distributes the channel processing resources in accordance with different cell traffics to achieve efficient share of a plurality of cell processing resources. The signal route distribution unit 203 can be disposed outside of the CBTS as a separate equipment other than be disposed inside the CBTS as illustrated in FIG. 2. The RRUs 2041, 2042, . . . 204M are mainly composed of functional units such as radio frequency power amplifiers in transmission channel, low noise amplifiers in receiving channel, and antennas, etc (not shown entirely). Typically, the links between the central channel processing subsystem 201 and the Remote Radio Units (RRUs) 2041, 2042 . . . , 204M can use such transmission media as optical fiber, copper cable, microwave, etc.

In the two BTS systems using RRH technology discussed above, the key problem to be solved is the wireless signal transmission between the RRU(s) and the host BTS. The host BTS herein represents units included in the BTS and including baseband processing unit except the radio frequency unit in the two BTS systems using RRH technology discussed above. Typically, analog intermediate frequency or analog radio frequency signal transmission scheme is adopted. Although it is easier to adopt analog signal transmission scheme, there will be disturbing components, for example noise, etc, in analog lines, and the modulation of the transmitted signal will introduce nonlinear distortion, in addition, the analog transmission may decrease the utilization of transmission line, and hamper the implementation of large capacity multiplex technology, therefore, it is difficult to adopt the analog transmission scheme in large scale networking.

To solve the problems, the scheme of digital signal transmission is proposed in the following two patents: Chinese patent application CN1464666, entitled "A soft BTS system based on remote fiber and its synchronization method" filed on Jun. 11, 2002, and Chinese patent application CN1471331, entitled "The BTS system in mobile communication" filed on Jul. 2, 2003 (the priority date being Jul. 2, 2002), the scheme of digital base band signal transmission is generally used to decrease the requirement for transmission bandwidth as much as possible. However, CN1464666 disclosed only the simple method of using optical fiber to transmit digital I/Q (In-phase/Quadrature) baseband signal between the RRU and the host BTS, that is, the digital I/Q base band signal is converted to serial data stream by means of parallel to serial conversion at the transmitting end, and then transmitted to the receiving end via an optical transmitter, and restored to the digital I/Q base band signal by means of serial to parallel conversion after received by an optical receiver and the receiving end. CN1471331 proposed a transmission technology of using Ethernet technology in physical layer, the technology uses continuous bit stream format specially defined instead of Ethernet MAC (Media Access Control) frame. At present, a corporation organization named CPRI (Common public Radio Interface) is also engaged in the standardization of the digital baseband transmission between the RRU(s) and the host BTS, and its technology specification can be obtained from its website. The technology specification adopts a technology similar to that adopted in CN1471331, that is, physical interface uses 1000 MB or 10 GB Ethernet standard, upper layer uses a continuous bit stream format user-defined, but CPRI only supports star networking in the form of point to point, whereas CN1471331 can support the link converge based on hub.

On the other hand, SDH (Synchronous Digital Hierarchy) and OTN (Optical Transmission Network) based on Wavelength Division Multiplex technologies such as DWDM (Dense Wavelength Division Multiplex)/CWDM (Coarse Wavelength Division Multiplexing) have been widely used in backbone network and wideband Metropolitan Area Network (MAN), but the existing technology of digital transmission between the RRU(s) and the host BTS uses special transport protocols and specification, and therefore, it is difficult to use the existing maturate wideband transmission resource in the existing telecommunication network, so the networking cost is increased, moreover, there are problems, such as nonflexible networking and complicated maintenance and management, in the existing technology of digital transmission between the RRU and the host BTS.

2. Generic Framing Procedure (GFP)

Generic Framing Procedure (GFP) is jointly recommended by ITU-T and ANSI, it is used to adapt the data stream of block coding or packet types to continuous byte synchronization transmission channel, typically for example the new technologies as SDH (Synchronous Digital Hierarchy) and OTN (Optical Transmission Network), the detailed technology specification of which may be referred to ITU-T G.7041 or ANSI TIX1.5/2000-024R3, which are hereby incorporated by reference. GFP can be classified into a frame mapping GFP (GFP-F) that supports PDU (Protocol Data Unit) and a transparent GFP (GFP-T) that supports block coding. The GFP-F can be used in the adaptation of protocol packet as PPP (Point to Point Protocol), MPLS (Multi-Protocol Label Switching), and Ethernet MAC (Media Access Control), etc, and the GFP-T can be used to directly adapt block coding character stream in 1000 MB Ethernet line, etc., accordingly, some application requirements for very little time delay can be satisfied, but the utilization of the GFP-T transfer bandwidth is lower than that of GFP-F transfer bandwidth.

In FIG. 3, a frame structure of GFP-T type is illustrated schematically. The GFP-T frame is composed of a core header and a payload part, and the payload part includes a payload header, payload and a selectable payload FCS (Frame Check Sequence). The core header includes a PL1 field indicating the payload length and a core header error control field (cHEC) which is functioned as GFP frame delimitation similar to ATM (Asynchronous Transfer Mode) Cell delimitation as well as provides error protection for the core header. The payload header indicates payload types and provides error protection by the cHEC. The Payload Type Identifier (PTI) indicates that the GFP-T frame carries user data when it is "000", and indicates that the GFP-T frame carries client management information when it is "100", while the payload FCS indicator (PFI) indicates if there is a payload FCS. User Payload Identifier (UPI) and the PTI together indicate the types of user data or client management information in the payload, as illustrated in table 1 and 2.

TABLE 1

| PTI = 000 | |
| --- | --- |
| UPI value | GFP frame payload |
| 0000, 0000, 1111, 1111 | Reserved unused |
| 0000, 0001 | Frame mapping Ethernet MAC |
| 0000, 0010 | Frame mapping PPP |
| 0000, 0011 | Transparent optical fiber channel |
| 0000, 0100 | Transparent FICON |
| 0000, 0101 | Transparent ESCON |
| 0000, 0110 | Transparent GB Ethernet |
| 0000, 0111 | reserved |
| 0000, 1000 | Frame mapping MAPOS |
| 0000, 1001~1110, 1111 | Reserved for future standard |
| 1111, 000~1111, 1110 | Reserved for exclusive use |

TABLE 2

| PTI = 100 | |
| --- | --- |
| UPI value | GFP frame payload |
| 0000, 0000, 1111, 1111 | Reserved unused |
| 0000, 0001 | Client signal failure (lose client signal) |
| 0000, 0010 | Client signal failure (lose client character synchronization) |
| 0000, 0011, 1111, 1110 | Reserved for future use |

In addition, Extension Header Identifier (EXI) indicates the presence of a selectable extension header and its type, at present, a typical use of the extension header is providing channel identifier (CID), therefore supporting the multiplex of multiple separate client signals. As illustrated in FIG. 3, the payload in the GFP-T frame is super block with fixed length which is formed sequentially by 64B/65B code block. Since the direct adaptation of the transparent GFP now uses block coding character stream of a 8B/10B line code, 64B/65B code block includes user data character and control character, so a flag bit is used to indicate if there is a control character in the 64B/65B code block (the bit indicated by L1, L2, . . . , L8 in FIG. 3), wherein the high 4 bits of the control character are used as the following control character indication and the position indication of the control code in the original 8B/10B code stream, and the low 4 bits are used to transmit the control code itself.

To ensure the transmission of the client signal, the bandwidth of the transmission channel, for example SDH/OTN, etc, should be a little wider than the bandwidth required by the GFP frame, since the size of each super block in the GFP-T frame is 536 bits, the bit length of the GFP-T frame, L can be denoted as:

$$L = L_{overhead} + 536 \cdot N \quad (1)$$

wherein N is the number of the super blocks in the GFP-T frame, $L_{overhead}$ is the overhead length of the core header, the payload header and the selectable payload FCS, etc, in the GFP-T frame. If the original client signal rate is $B_C$ bit/s, and the bandwidth of transmission channel for example SDH/OTN, etc, is $B_T$ bit/s, considered that each super block can carry a client signal stream of 512 bits, the number of the super blocks in the GFP-T, N should satisfy the following expression:

$$\frac{L}{B_T} < \frac{512 \cdot N}{B_C} \quad (2)$$

So the minimum number of the super blocks required by the GFP-T frame to satisfy the above condition, N is:

$$N_{min} = \left\lceil \frac{B_C L_{overhead}}{512 B_T - 536 B_C} \right\rceil \quad (3)$$

Wherein symbol $\lceil x \rceil$ indicates the minimum integer larger than or equal to x.

3. Virtual Concatenation (VCAT) Technology

The STM-N/OTM-n standard transmission link of SDH/OTN is formed by multiplexing some typical Virtual Containers (VCs) with fixed rate according to certain multiplex rules. For example, the basic VCs of SDH include VC-11, VC-12, VC-2, VC-3, and VC-4, while VC-4 can further form four VCs with higher rate: VC-4-4c, VC-4-16c, VC-4-64c, and VC-4-256c by means of sequential concatenation, as illustrated in table 3.

TABLE 3

| VC type | VC bandwidth | VC payload bandwidth |
|---|---|---|
| VC-11 | 1664 Kbit/s | 1600 Kbit/s |
| VC-12 | 2240 Kbit/s | 2176 Kbit/s |
| VC-2 | 6848 Kbit/s | 6784 Kbit/s |
| VC-3 | 48.960 Mbit/s | 48.384 Mbit/s |
| VC-4 | 150.336 Mbit/s | 149.760 Mbit/s |
| VC-4-4c | 601.344 Mbit/s | 599.040 Mbit/s |
| VC-4-16c | 2405.376 Mbit/s | 2396.160 Mbit/s |
| VC-4-64c | 9621.504 Mbit/s | 9584.640 Mbit/s |
| VC-4-256c | 38486.016 Mbit/s | 38338.560 Mbit/s |

The technology of using finite number of fixed rate VCs has simplified SDH multiplex design, and made it easier to realize Add/Drop, multiplex and digital cross connect, but since a plenty of paddings are needed to adapt specific VC rate, the transmission efficiency is influenced. Whereas the Virtual Concatenation (VCAT) technology allows for providing more selections on transmission bandwidth by inversely multiplexing a plurality of VCs having the same rate, so the problems with transmission efficiency are solved. But since respective VC arrives at the receiving end via separate transmission paths, certain buffer is needed at the receiving end to eliminate the difference due to transmission delay.

SUMMARY OF THE INVENTION

To solve the problems with the wireless signal transmission between the RRU(s) and the host BTS in the existing technology, it is therefore an object of the present invention to provide a signal transmission method and system of wireless BTS based on RRH technology. The effective wireless signal transmission between the RRU(s) and the host BTS can be realized without specific transmission network, and therefore networking cost can be reduced, by using the existing bandwidth resource in the existing telecommunication transmission network, especially accessing directly the transmission technology based on SDH/OTN in the existing technology between the RRU(s) and the host BTS, that is, adopting STM-N/OTM-n standard interface directly.

Another object of the present invention is to simplify the management and maintenance operations required by the signal transmission between the RRU and the host BTS, by making use of the perfect line protection and self-healing mechanism, the flexible networking manner and the maturate network management function inherent in SDH/OTN.

According to one aspect of the invention, a method of signal transmission between a host BTS and one or more RRU (s) is proposed, wherein the transmission channel between the host BTS and the one or more RRU (s) communicates utilizing a wideband transmission link or network, the method comprising the steps of: performing the transmission over the transmission channel using Synchronous Digital Hierarchy (SDH)/Optical Transmission Network (OTN); and forming a digital wireless signal data stream and an in-band control signaling stream transmitted over the transmission channel into a Generic Framing Procedure (GFP) frame, and mapping the GFP frame to a STM-N/OTM-n frame, thereby multiplexing the digital wireless signal data stream and the in-band control signaling stream to realize SDH/OTN-based transmission.

According to another aspect of the invention, a BTS communication system of signal transmission between a host BTS and one or more Remote Radio Unit (s) is proposed, wherein the transmission channel between the host BTS and the one or more RRU (s) communicates using wideband transmission link or network, the BTS communication system at least includes: a Synchronous Digital Hierarchy (SDH)/Optical Transmission Network (OTN) communication interface disposed at the transmission channel, the communication interface being used to form a digital wireless signal data stream and an in-band control signaling stream transmitted over the transmission channel into a Generic Framing Procedure (GFP) frame which is further mapped to a STM-N/OTM-n frame, thereby multiplexing the digital wireless signal data stream and the in-band control signaling stream to realize SDH/OTN-based transmission.

BRIEF DESCRIPTION OF THE DRAWINGS

The invention will be better understood when reading the preferred embodiments of the invention in conjunction with accompanying drawings, wherein:

FIGS. 7A, 7B schematically show the SDH/OTN-based transmission between a host BTS and one or more Remote Radio Unit(s) in accordance with the forth embodiment of the present invention;

FIGS. 8A, 8B schematically show the SDH/OTN-based transmission between a host BTS and one or more Remote Radio Unit(s) in accordance with the fifth embodiment of the present invention;

DESCRIPTION OF THE PREFERRED EMBODIMENTS

Figure 1A:
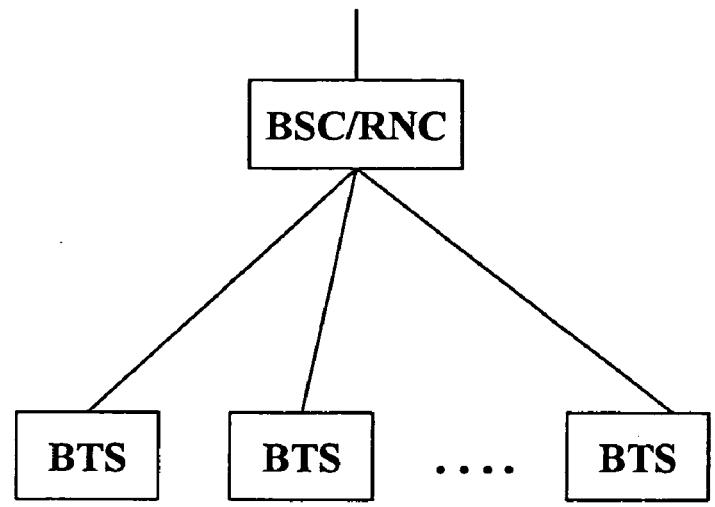
FIG. 1A schematically shows the structure of a wireless access network in a conventional mobile communication system.
Figure 1B:
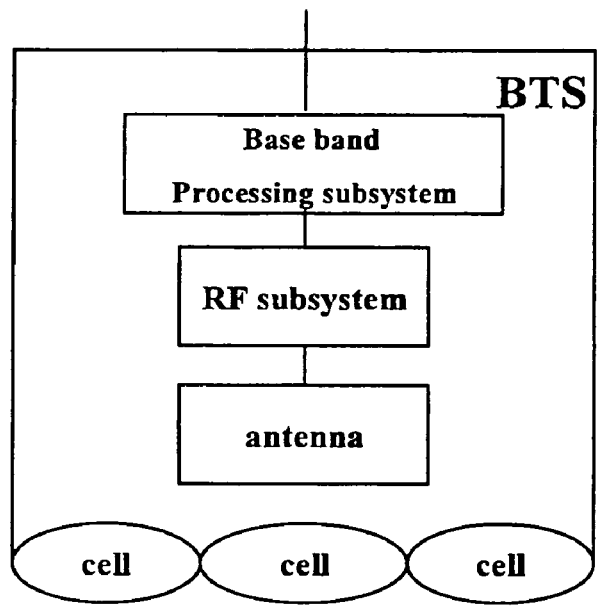
FIG. 1B schematically shows the basic structure of a BTS system in a conventional mobile communication system.
Figure 2:
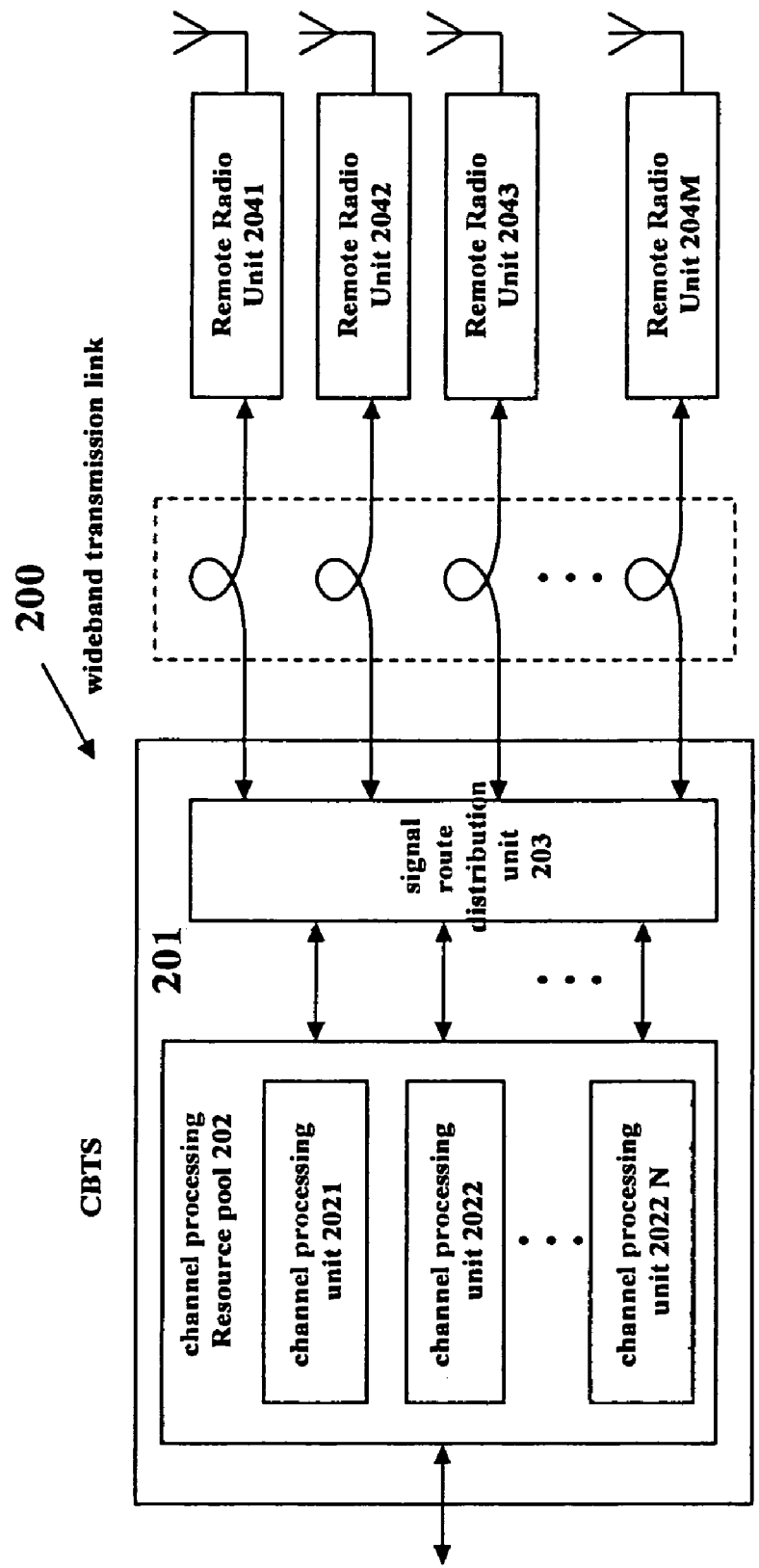
FIG. 2 schematically shows the structure of a CBTS system using RRH technology.
Figure 3:
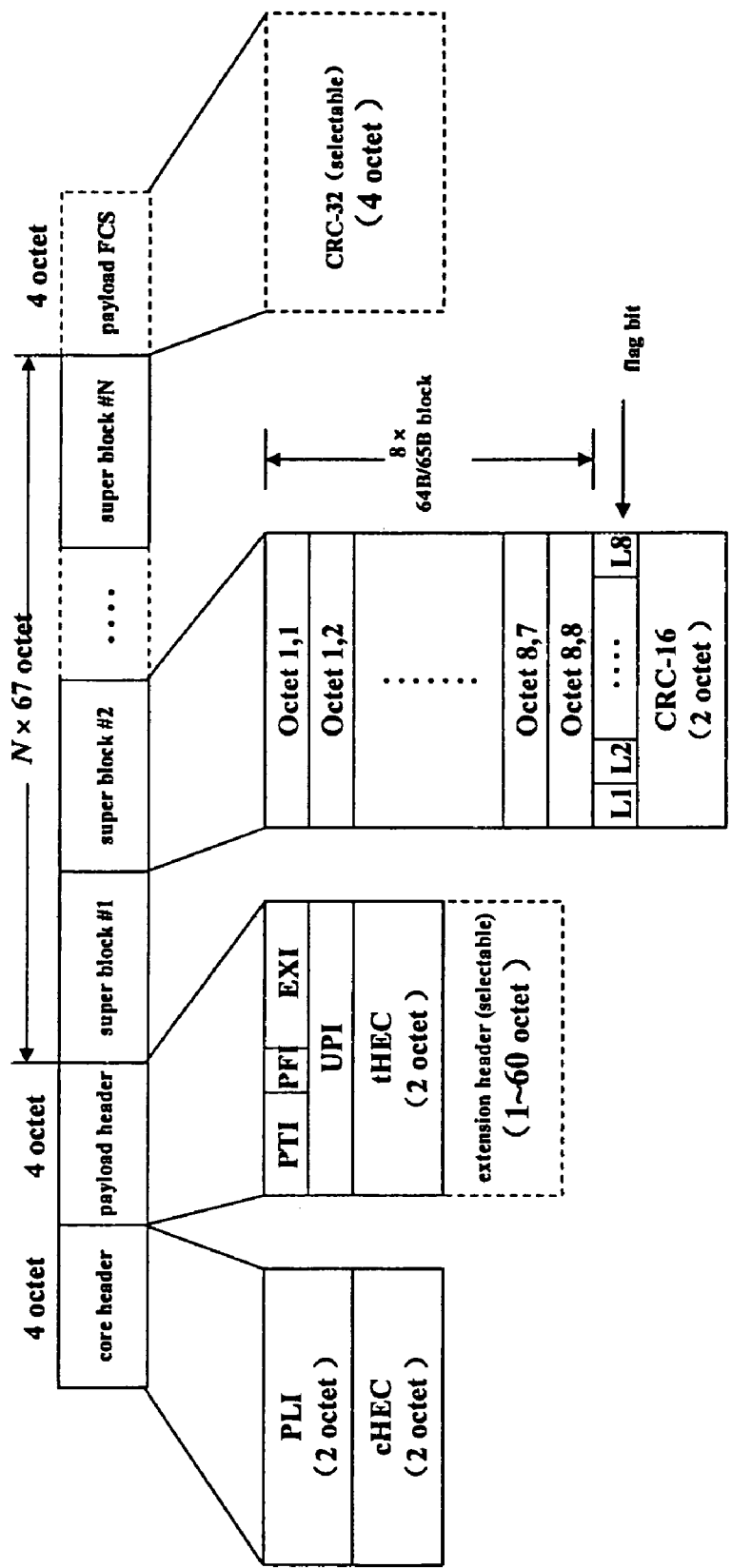
FIG. 3 schematically shows a GFP-T frame structure for block coding character stream according to GFP.

The objectives, benefits, and advantageous effects of the present invention will be more clearly understood from the following detailed description of the invention taken in conjunction with the accompanying drawings.

As discussed previously, to solve the problems with the digital wireless signal transmission between RRU(s) and a host BTS in the existing technology, the present invention has proposed a technology of digital wireless signal transmission between the RRU(s) and the host BTS, which is compatible with the existing telecommunication transmission network technology, and can access to the existing SDH/OTN transmission network. Since the proposed technology directly adopts the STM-N/OTM-n standard interface in the SDH/OTN transmission network, the digital wireless signal transmission between the RRU(s) and the host BTS can be realized without specific transmission network.

The management and maintenance operations of the signal transmission between the RRU(s) and the host BTS are significantly simplified because of the perfect line protection and self-healing mechanism, the flexible networking manner and the maturate network management function inherent in the SDH/OTN. Furthermore, since the SDH has gradually developed to a MSTP (Multi-Service Transport Platform) network capable of multiple services transmission, according to the invention, the data transmission between various nodes within the wireless access network, including between the RRU(s) and the host BTS, between the BTS and the BSC/RNC, and between the BTS and the BTS (which is a new structure of the Wireless Access Network) can be realized using the same transmission network, therefore the proposed technology of the present invention can greatly reduce the complexity and the cost of network construction and also have the advantages of flexible networking and easy maintenance.

Other than the digital wireless signal data stream transmitted between the RRU(s) and the host BTS, there includes other control, management, and operation-maintenance data (referred to as in-band control signaling hereinafter). The control and management information includes control signaling such as the building and modification of the links between the RRU(s) and the host BTS, rate negotiation, data format, and operation mode negotiation, etc, as discussed previously. Besides indication information such as link asynchronous, failure, etc, the operation and maintenance (O&M) information is mainly O&M information of the RRU, because the maintenance and fault tolerance of the transmission link are mainly realized by the transmission network itself using the maturate SDH/OTN transmission technology in the present invention.

According to the invention, since the transmission delay in the digital wireless signal data stream transmission is required to be as little as possible, the digital wireless data stream and its in-band control signaling can be mapped to a STM-N/OTM-n frame by using GFP frame structure, and therefore SDH/OTN-based transmission can be realized. In the present invention, 8B/10B coding/decoding operation in the GFP-T is omitted. The present invention has proposed a plurality of schemes of multiplexing the in-band control signaling and the digital wireless signal data stream, and therefore the digital wireless signal data stream and the corresponding in-band control signaling can be transmitted simultaneously over the same transmission channel. Since the present invention is the extension of GFP protocol, most of the software and hardware designs of GFP can be used directly in the specific implementation, and so the degree of implementation difficulty is significantly reduced.

1. Multiplexing a Digital Wireless Signal Data Stream and an in-Band Control Signaling as Well as STM-N/OTM-n Frame Mapping 1.1 The Transmission of the in-Band Control Signaling Using a Client Management Frame (CMF)

Figure 4A:
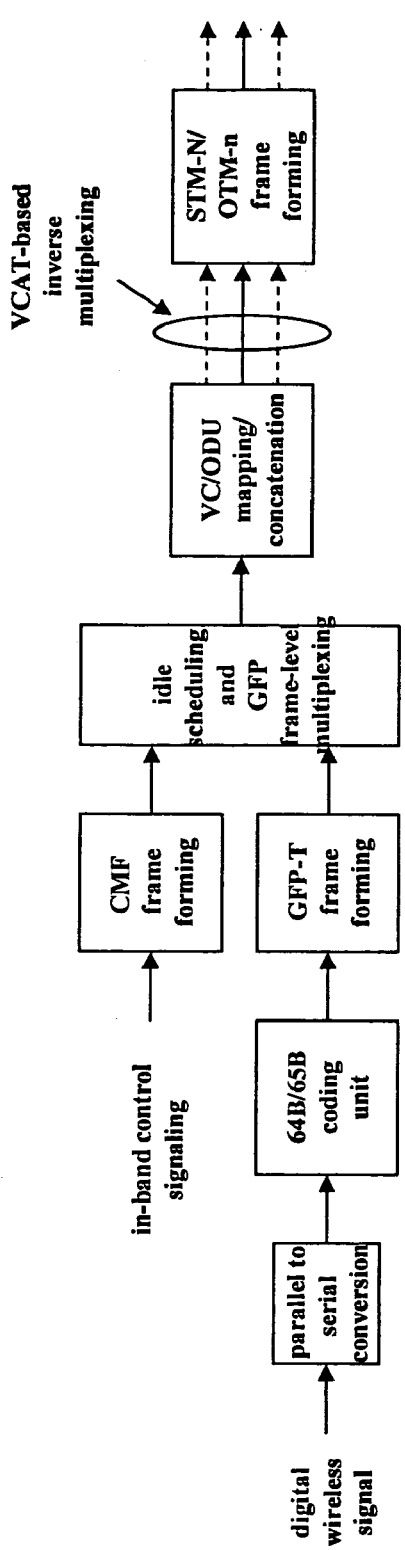
FIGS. 4A, 4B schematically show the SDH/OTN-based transmission between a host BTS and one or more Remote Radio Unit(s) in accordance with the first embodiment of the present invention.
Figure 4B:
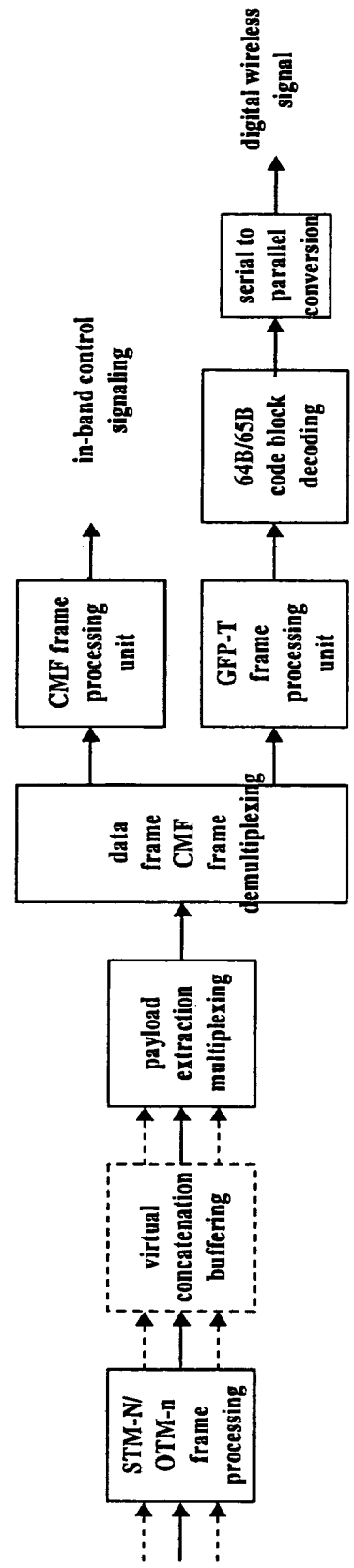

FIG. 4 schematically shows a scheme of the signal transmission between the RRU(s) and the host BTS according to the present invention. Specifically, FIGS. 4A, 4B schematically show the SDH/OTN-based transmission between a host BTS and one or more Remote Radio Unit(s) in accordance with the first embodiment of the present invention. In this scheme, the in-band control signaling is sent in the form of a GFP-T client management frame (CMF) (PTI=100), and is transmitted using idle bandwidth in the GFP-T Client Data Frame which transmits the digital wireless signal data stream after proper schedule is made. The definitions of UPI=00000001 and UPI=00000010 are the same with those in the existing GFP protocol, i.e. the indication information shown in table 1, 2, such as link asynchronous, failure, etc, and the UPI of the CMF frame carrying the in-band control signaling may use the values reserved between 00000011 and 11111110. The in-band control signaling may be disassembled into different control messages, and different UPI values can be defined respectively to distinguish them.

The transmission of the in-band control signaling using the CMF frame can utilize residual transmission bandwidth effectively, but in order to reduce the effect of the clock recovery of the digital wireless signal client data stream at the receiving end as much as possible and to control the transmission delay effectively, the payload in each CMF frame should be as little as possible (typically less than 8 bytes) according to the suggestion of the GFP specification, and the user data frame should have a higher priority compared with the CMF frame, that is, the CMF frame should be sent only when the client signal input buffer is close to null (here using 65B_PAD padding character is required), and only a single CMF frame can be sent every time, in addition, the payload FCS can be used to provide error protection for the transmission of the in-band control signaling in order to increase the reliability of the in-band control signaling.

As illustrated in FIG. 4A, at the transmitting end, a sampled digital wireless signal is mapped to a 64B/65B code block by a 64B/65B coding unit after subjected to a parallel to serial conversion, and then is formed into a GFP-T client data frame. Since digital wireless signal data stream is not a 8B/10B line code stream, each 64B/65B code block may only include the 65B_PAD padding character, not any other control characters. On the other hand, the in-band control signaling stream may also be formed into a CMF frame (also including the defined CMF frame for indication information such as link asynchronous and failure, etc.), as discussed previously. Only when the 65B_PAD padding character is needed, can a single CMF frame be sent at the gap between the client data frames carrying the digital wireless signal stream, the multiplexed GFP frames can be mapped to the STM-N/OTM-n frame according to the existing technology, therefore SDH/OTN-based transmission can be realized. If the SDH transmission is used, the multiplexed GFP frame is mapped to a VC first, and then formed into a STM-N frame. Generally the data rate of the digital wireless signal is much faster than the basic VC rate, so sequential concatenation or Virtual Concatenation are needed, as discussed previously, although the bandwidth utilization is higher using the VCAT technology, the transmission delay is increased, so the requirement for the transmission delay in up/down link can not be satisfied in some mobile communication systems adopting rapid power control technology. In OTN, the manner of ODU (Optical Channel Data Unit) concatenation is only VCAT, since the ODU rate is very high, the wireless signal transmission between the RRU(s) and the host BTS does not use virtual concatenation ODU.

As illustrated in FIG. 4B, at the receiving end, the required VC/ODU is separated from the STM-N/OTM-n frame at first (when using virtual concatenation VC, certain buffer is required to eliminate the differences between the transmission delays of respective VCs), and payload GFP frame is extracted, then the CMF frame is separated from the client data frame. The in-band control signaling stream is obtained from the CMF frame, while for the client data frame, the 64B/65B code block is first obtained, and then the digital wireless signal data stream is restored after the 64B/65B code block is subjected to a 64B/65B decoding unit and a serial to parallel conversion unit.

Figure 5A:
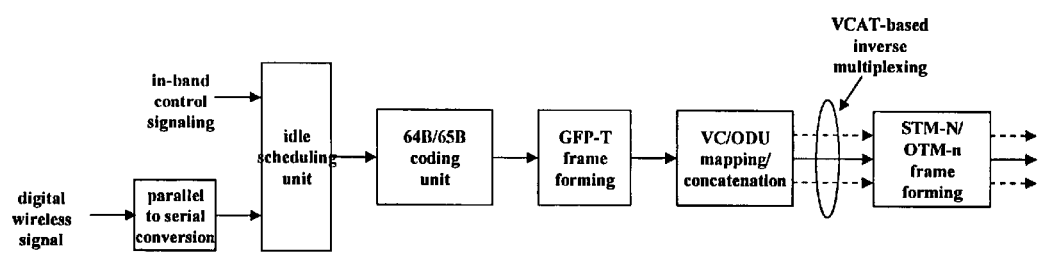
FIGS. 5A, 5B schematically show the SDH/OTN-based transmission between a host BTS and one or more Remote Radio Unit(s) in accordance with the second embodiment of the present invention.
Figure 5B:
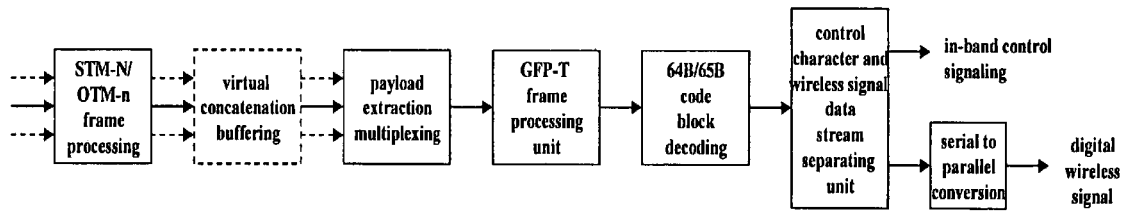

1.2 The Scheme of Transmitting an in-Band Control Signaling Using Control Character FIG. 5 shows another scheme of the signal transmission between the RRU(s) and the host BTS in accordance with the invention. Specifically, FIGS. 5A, 5B schematically show the SDH/OTN-based transmission between the host BTS and the Remote Radio Unit(s) in accordance with the second embodiment of the present invention. This scheme uses 64B/65B code block control character bit to transmit an in-band control signaling. As illustrated in FIG. 5A, at the transmitting end, a sampled digital wireless signal is mapped to a 64B/65B code block by a 64B/65B coding unit after subjected to a parallel to serial conversion, and then is formed into a GFP-T client data frame. The 64B/65B code block may include two kinds of control characters, namely a padding character and an in-band control signaling stream character, other than digital wireless signal data characters. The in-band control signaling stream character can enter into the 64B/65B coding unit according to the following schedule procedure: when the digital wireless signal data stream input buffer is close to null, if the in-band control signaling stream input buffer is not null, the in-band control signaling stream character enters into the 64B/65B coding unit as a control character, otherwise it is padded by the padding character. As illustrated in FIG. 5B, the processes at the receiving end are inverse to the processes at the transmitting end, except that the 64B/65B decoding unit separates the digital wireless signal and the in-band control signaling, other processes are the same with that illustrated in FIG. 4B.

Figure 9:
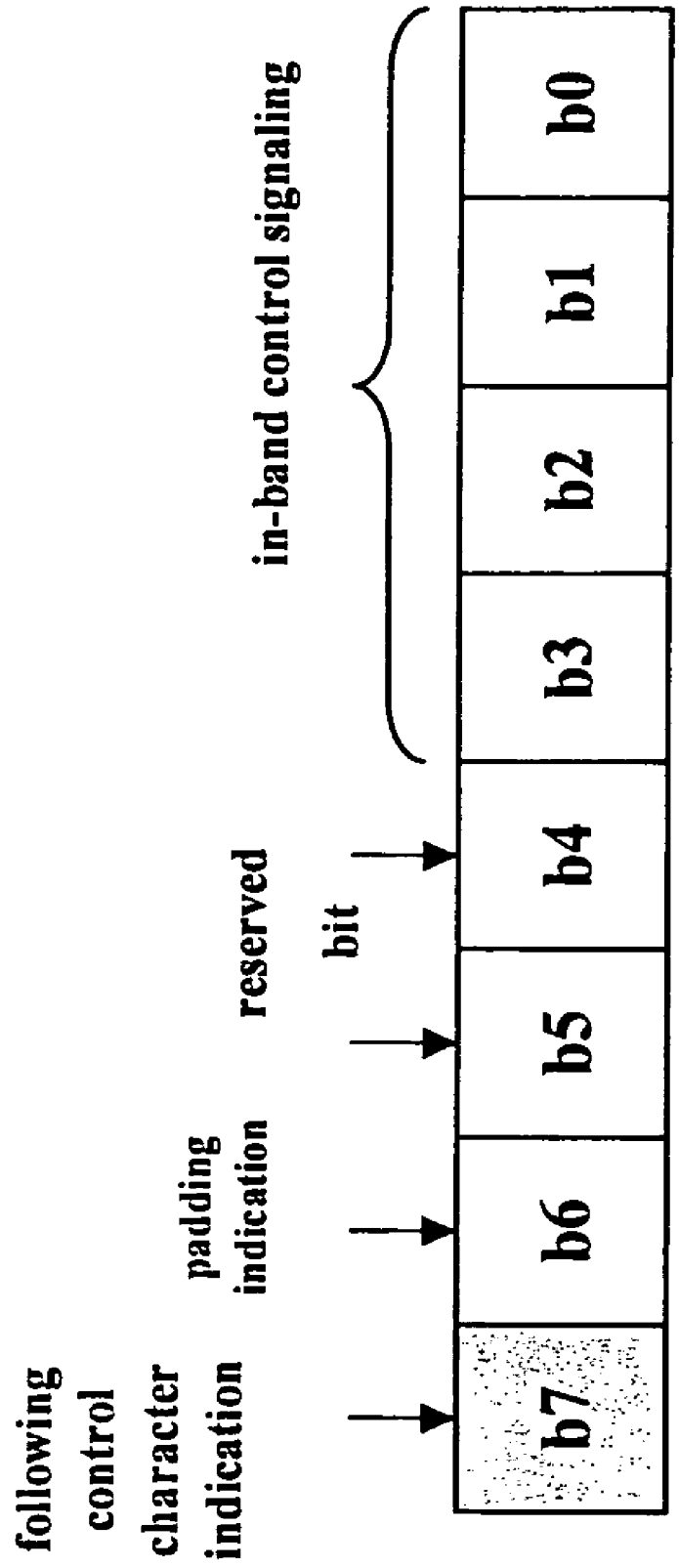
FIG. 9 is the definition of the control character in the scheme of transmitting in-band control signaling using the control character, in accordance with the second embodiment of the present invention.

As discussed previously, in GFP specification, only the low 4 bits of the control character in the 64B/65B code block are used to transmit a control code, whereas the high 4 bits are used as the following control character indication and the position identifier of the control code in the original 8B/10B code stream. Since 8B/10B coding is not used in the present invention, the control character is used to transmit the in-band control signaling as well as used as the padding character, therefore it is needed to redefine the bits of the control character. As a nonrestrictive example for illustrating, FIG. 9 shows a kind of definition for the control character, in which the definition of the most significant bit b7 is the same with that in the original GFP specification, i.e. indicating whether the following bytes in the 64B/65B code block are the control characters, b6 is used to indicate if the control character is the padding character, b5/b4 are reserved for the future extension, and the low 4 bits are used to transmit the in-band control signaling.

Figure 6A:
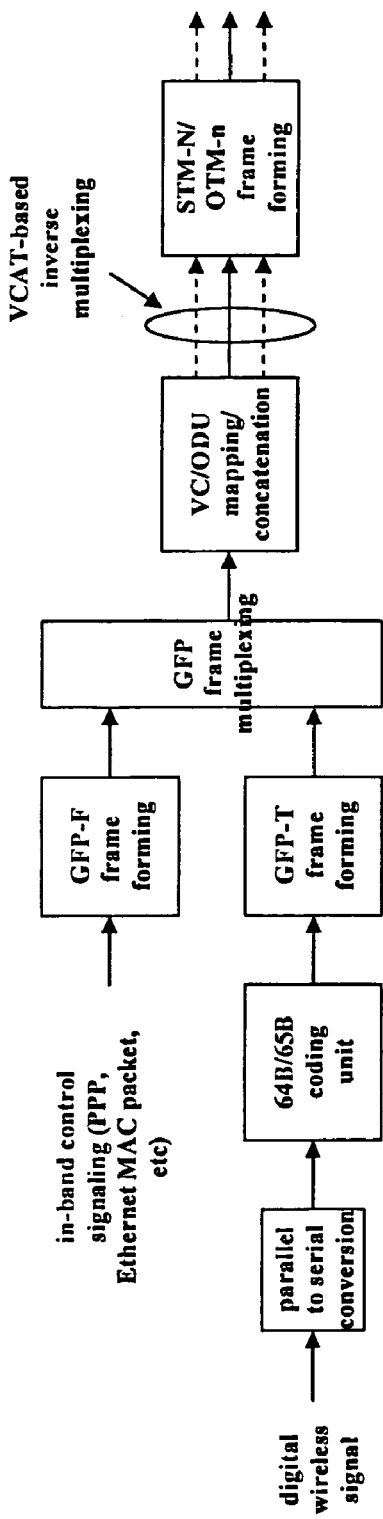
FIGS. 6A, 6B schematically show the SDH/OTN-based transmission between a host BTS and one or more Remote Radio Unit(s) in accordance with the third embodiment of the present invention.
Figure 6B:
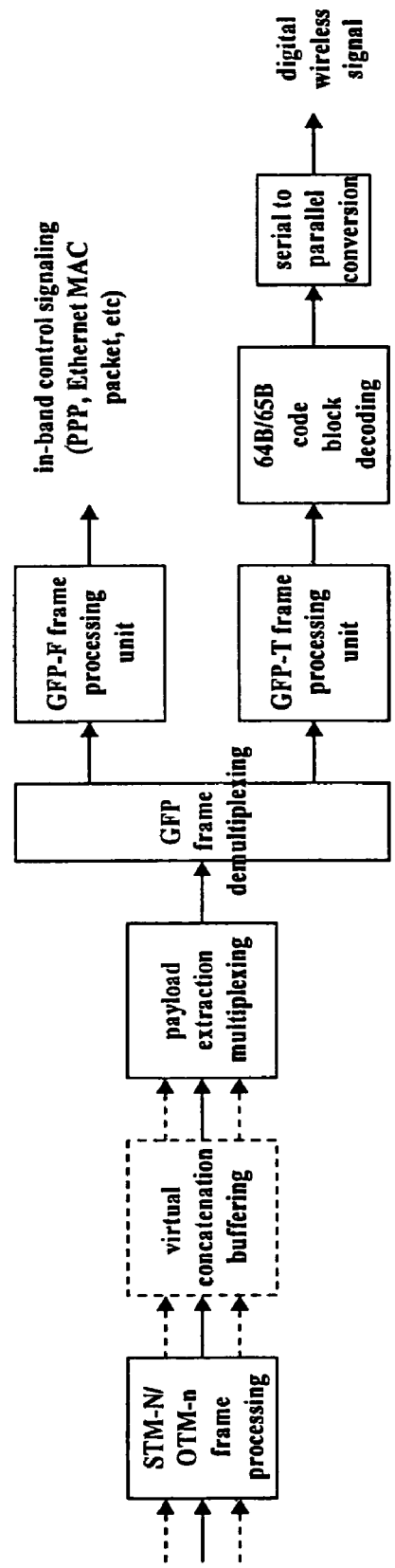

1.3 The Multiplex Scheme of Mapping an in-Band Control Signaling Link Layer Packet to a GFP-F Frame FIG. 6 shows another scheme of the signal transmission between the RRU(s) and the host BTS in accordance with the present invention. Specifically, FIGS. 6A, 6B schematically show the SDH/OTN-based transmission between the host BTS and Remote Radio Unit(s) in accordance with the third embodiment of the present invention. The technology of this scheme adopts the GFP frame-level multiplex to transmit a digital wireless signal data stream and an in-band control signaling link layer packet simultaneously. That is, as illustrated in FIG. 6A, the in-band control signaling link layer packet is carried by means of GFP(GFP-F) of the frame mapping mode and is regarded as another independent client signal that is GFP frame-level multiplexed with the digital wireless signal data stream. And in FIG. 6B, the digital wireless signal GFP-T frame and the in-band control signaling GFP-F frame are demultiplexed accordingly, and the digital wireless signal data stream and the in-band control signaling link layer packet are respectively restored by means of GFP-T frame processing and GFP-F frame processing. Since the digital wireless signal data stream and the in-band control signaling link layer packet use GFP frames of different modes, they can be rightly separated from each other without any other identifiers.

The in-band control signaling link layer packet is larger, which is a disadvantage to the time delay in the digital wireless signal data stream transmission and the clock recovery, in order to solve this problem, the following measures can be used according to the present invention: (1) using smaller control signaling link layer packet, for example, by selecting smaller Maximum Transmission Unit (MTU), that is, determining the proper value of the MTU by comprehensively considering transmission efficiency (the smaller the MTU, the bigger the cost of the packet head, and the lower the transmission efficiency) and reducing the above disadvantages as much as possible; (2) in the scheduling of GFP frame-level multiplex as shown in FIG. 6A, the GFP-T frame carrying the digital wireless signal data stream is transmitted at first, and only when the digital wireless signal data stream input buffer is close to null, can the GFP-F frame carrying the in-band control signaling link layer packet be transmitted.

1.4 The Multiplex Scheme of Mapping an in-Band Control Signaling to a GFP-T Frame FIG. 7 shows another scheme of the signal transmission between the RRU(s) and the host BTS in accordance with the present invention. Specifically, FIGS. 7A, 7B schematically show the SDH/OTN-based transmission between the host BTS and the Remote Radio Unit(s) in accordance with the fourth embodiment of the present invention. The technology of this scheme adopts GFP frame-level multiplex to transmit a digital wireless signal data stream and an in-band control signaling simultaneously. That is, as illustrated in FIG. 7A, the in-band control signaling is regarded as another independent client signal that is GFP frame-level multiplexed with the digital wireless signal data stream. And in FIG. 7B, the digital wireless signal GFP-T frame and the in-band control signaling GFP-T frame are demultiplexed accordingly, and the in-band control signaling and the digital wireless signal are separated from each other by decoding them respectively, and other sending and receiving processes are similar to those in the above schemes.

According to the invention, in order to eliminate the influence on the clock recovery of the digital wireless signal data stream at the receiving end and to reduce the transmission delay, it is preferred that the digital wireless signal GFP-T frame and the in-band control signaling GFP-F frame should be scheduled in a manner of fixed distribution, when the GFP frame-level multiplex is adopted. That is, one in-band control signaling GFP-F frame mapped will be transmitted when every M (M≧1) digital wireless signal GFP-T frames are transmitted, and it will be padded if certain input buffer is null. In addition, as discussed previously, the payload header in the GFP-T frame needs to add the extension header to provide Channel Identifier (CID) for supporting the multiplex of a plurality of client signals, i.e., properly separating the GFP-T frames that the digital wireless signal data stream and the in-band control signaling correspond to.

1.5 The Time Division Multiplex Scheme of a Digital Wireless Signal Data Stream and an in-Band Control Signaling FIG. 8 shows another scheme of the signal transmission between the RRU(s) and the host BTS in accordance with the present invention. Specifically, FIGS. 8A, 8B schematically show the SDH/OTN-based transmission between the host BTS and the Remote Radio Unit(s) in accordance with the fifth embodiment of the present invention. The technology of this scheme multiplexes a digital wireless signal data stream and an in-band control signaling within one GFP-T frame to form a single client signal data stream using TDM technology, the single client signal data stream is then formed into a GFP-T frame and is further mapped to a STM-N/OTM-n frame to be transmitted by means of the 64B/65B coding unit and other units shown in FIG. 8A. The time division multiplex within one GFP-T frame as discussed above means to divide the client signal data block transmitted by each GFP-T frame with fixed length into two regions with fixed size, one region is used to transmit the digital wireless signal data stream, and the other is used to transmit the in-band control signaling, the reason for adopting time division multiplex within one GFP-T frame is in that each GFP-T frame can define the boundary of a multiplexed data block, therefore the digital wireless signal data stream and the in-band control signaling can be separated from each other and be extracted according to the predetermined TDM structure. As illustrated in FIG. 8B, the processes at the receiving end are inverse to the processes at the transmitting end, except that the demultiplexing unit separates the digital wireless signal from the in-band control signaling at last, other processes are same with that illustrated in FIG. 4B. In addition, since the in-band control signaling is not continuous bit stream, if there is no in-band control signaling data to be transmitted during each in-band control signaling transmission period, the 65B_PAD padding character is used to pad.

2. Clock Recovery and Count

In the mobile communication system, the frequency stability of the BTS's radio frequency unit is required to be relatively high, generally up to an accuracy of 0.05 ppm, thus synchronous clock signal with high stability needs to be restored in the RRU, the clocks in the receiving/transmitting ends also need to be synchronized to transmit the digital wireless signal data stream between the RRU(s) and the host BTS.

Figure 10:
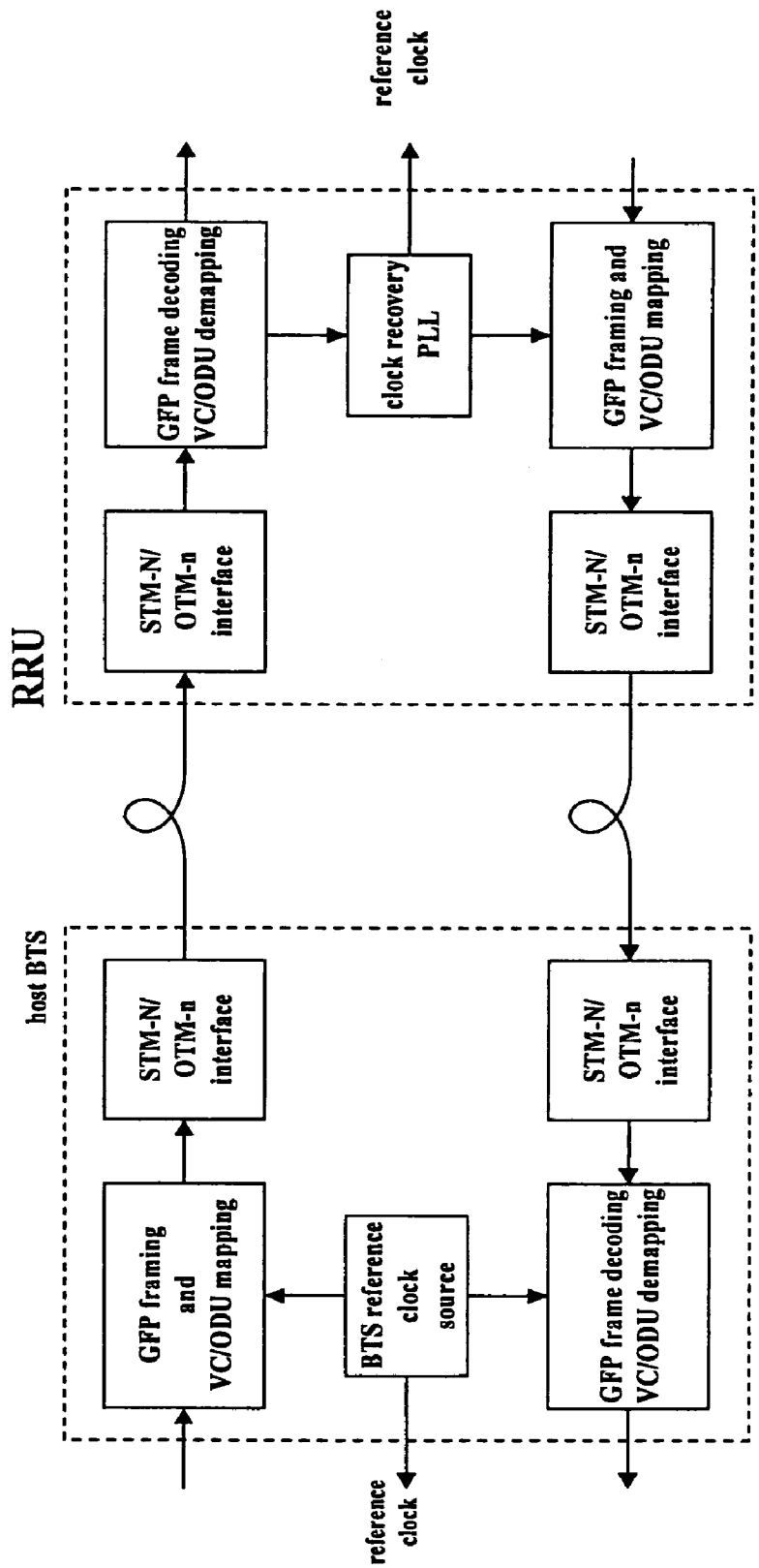
FIG. 10 shows clock recovery and the timing of the Remote Radio Unit in accordance with the present invention.

FIG. 10 is a schematic drawing that shows the clock recovery and RRU timing in accordance with the present invention. The host BTS uses a reference clock source with high stability. The reference clock source can provide timing for other units in the host BTS, also in down stream provide timing for modules such as GFP framing and VC/ODU mapping at the transmitting end of RRU wideband link interface, etc, the receiving end of the RRU wideband link interface uses PLL (Phase Locked Loop) based on the occupation station of FIFO (First In First Out) to restore the digital wireless signal data stream clock, and the restored clock can also be used as the reference frequency source for the RRU. In up stream, the modules such as the GFP framing and VC/ODU mapping at the transmitting end of the RRU wideband link interface, etc, send data using the synchronization clock obtained from down stream, and the receiving end of the host BTS wideband link interface provides timing for modules such as the GFP frame decoding and VC/ODU demapping, etc, using the above reference clock source. In addition, the clocks of the STM-N/OTM-n interface at the receiving/transmitting ends are extracted through SDH/OTN line directly, instead of using the above client data clock.

3. Link Layer Technology of an in-Band Control Signaling

In the above transmission schemes, except the multiplex scheme in which the in-band control signaling link layer packet is mapped to the GFP-F frame, other transmission schemes, namely the scheme of transmitting an in-band control signaling using a client management frame, the scheme of transmitting an in-band control signaling using control character, the multiplex scheme of mapping an in-band control signaling to the GFP-T frame, and the time division multiplex scheme of the digital wireless signal data stream and the in-band control signaling, only provide physical layer transmission methods of the in-band control signaling, although the in-band control signaling stream can be extracted from the digital wireless signal data stream, not every link layer packet can be distinguished.

Therefore, according to the present invention, if the link layer packet of the in-band control signaling is a HDLC (High-Level Data Link Control) frame or an ATM cell, etc, which have the structure of packeting and delimitation functions, the corresponding HDLC frame or ATM cell can be delimited using the features inherent in HDLC or ATM; and if the link layer packet of the in-band control signaling is PPP, Ethernet MAC frame, etc, which have not the structure of packeting and delimitation functions, or is IP packet directly, the corresponding function layer need to be added. Typically, for the PPP packet, the frame can be formed by HDLC or GFP-F; for the IP packet, it can be carried on PPP first, then the frame can be formed by HDLC or GFP-F; and for the Ethernet MAC frame, the frame can be formed by GFP-F.

The method and system of the wireless BTS signal transmission based on the RRH are disclosed above in conjunction with the accompanying figures, but the disclosures are not intended to limit the invention. Those skilled in the art will recognize that various modifications and improvements may be made to the invention according to the principle of the invention, without departing from the scope of the appended claims of the invention.

What is claimed is:

1. A method of signal transmission between a host Base Transceiver Station (BTS) and one or more Remote Radio Units (RRUs), wherein a transmission channel between the host BTS and the one or more RRU(s) communicates using wideband transmission links or a network, the method comprising:

performing the transmission between the host Base Transceiver Station and the one or more Remote Radio Units over the transmission channel between the host Base Transceiver Station and the one or more Remote Radio Units using Synchronous Digital Hierarchy (SDH)/Optical Transmission Network (OTN); and forming a digital wireless signal data stream and an in-band control signaling stream transmitted over the transmission channel into a Generic Framing Procedure (GFP) frame which is further mapped to a STM-N/OTM-n frame, thereby multiplexing the digital wireless signal data stream and the in-band control signaling stream to realize SDH/OTN-based transmission.

2. The method according to claim 1, wherein the method further comprises:

coding the digital wireless signal data stream, and forming the coded data stream into a GFP-T client data frame, the GFP-T frame being the type of frame as defined by Generic Framing Procedure GFP for supporting block coding;

forming the in-band control signaling stream into a GFP-T client management frame CMF; and sending single said client management frame CMF at a gap between the formed GFP-T client data frames, to GFP frame-level multiplex the digital wireless signal data stream and the in-band control signaling stream.

3. The method according to claim 2, wherein parallel to serial conversion is performed on the digital wireless signal before the digital wireless signal data stream is coded.

4. The method according to claim 2, wherein, after GFP frame-level multiplexing the digital wireless signal data stream and the in-band control signaling stream, the method further comprises:
mapping the multiplexed GFP frame to a Virtual Container (VC) first and then to a STM-N frame by means of sequential concatenation or virtual concatenation; or
mapping the multiplexed GFP frame directly to an OTM-n frame using Optical Channel Data Unit (ODU).

5. The method of according to claim 2, wherein the method further comprises:
extracting the GFP frame from a received STM-N/OTM-n frame; and
demultiplexing the extracted GFP frame, to separate the GFP-T client data frame and the GFP-T client management frame (CMF), so as to restore the in-band control signaling from the separated GFP-T client management frame, and decoding the separated GFP-T client data frame first and then restoring the digital wireless signal.

6. The method according to claim 5, wherein the step of extracting the GFP frame from the received STM-N/OTM-n frame further includes:
virtual concatenation buffering the received STM-N/OTM-n frame.

7. The method of signal transmission according to claim 5, wherein the method further comprises:
performing serial to parallel conversion on the decoded digital wireless signal.

8. The method according to claim 2, wherein the GFP-T client data frame is transmitted with higher priority than that of the GFP-T client management frame.

9. The method according to claim 2, wherein error protection for the transmission of the in-band control signaling is provided by a payload frame check sequence.

10. The method according to claim 2, wherein the method further comprises:
if the link layer packet of the in-band control signaling is a High-Level Data Link Control (HDLC) frame or an Asynchronous Transmission Mode (ATM) cell, delimitating a corresponding HDLC frame or ATM cell including the in-band control signaling using packeting and delimitation functions of HDLC or ATM;
if the link layer packet of the in-band control signaling is a Point to Point Protocol (PPP) packet, an Ethernet Media Access Control (MAC) packet or an IP packet directly, for the PPP packet, forming the frame by HDLC or GFP-F; for the IP packet, carrying the frame on PPP first, then forming the frame by HDLC or GFP-F; and for an Ethernet MAC frame, forming the frame by GFP-F.

11. The method according to claim 1, wherein the method further comprises:
coding the digital wireless signal;
transmitting the in-band control signaling using a control character in a code block used in the coding step; and
forming the coded digital wireless signal data stream that carrying the in-band control signaling into a GFP-T frame.

12. The method according to claim 11, wherein parallel to serial conversion is performed on the digital wireless signal before the digital wireless signal is coded.

13. The method according to claim 11, wherein after forming the GFP-T frame, the method further comprises:
mapping the GFP-T frame to a Virtual Container (VC) and then to a STM-N frame by means of sequential concatenation or virtual concatenation; or
mapping the GFP-T frame directly to an OTM-n frame using Optical Channel Data Unit (ODU).

14. The method according to claim 11, wherein the method further comprises:
extracting the GFP-T frame from a received STM-N/OTM-n frame;
decoding the extracted GFP-T frame; and
restoring the in-band control signaling and the digital wireless signal from the decoded GFP-T frame.

15. The method according to claim 14, wherein the step of extracting the GFP-T frame from the received STM-N/OTM-n frame further includes:
virtual concatenation buffering the received STM-N/OTM-n frame.

16. The method according to claim 14, wherein the method further comprises:
performing serial to parallel conversion on the restored digital wireless signal.

17. The method according to claim 11, wherein the definition of the control character in the code block is:
the most significant bit b7 is used to indicate whether the following byte in the code block is the control character;
the following bit b6 is used to indicate whether the control character is a padding character;
the last two bits b5/b4 in high 4 bits are reserved for the future extension; and
low 4 bits are used to transmit the in-band control signaling stream.

18. The method according to claim 11, wherein the method further comprises:
if the link layer packet of the in-band control signaling is a High-Level Data Link Control (HDLC) frame or an Asynchronous Transmission Mode (ATM) cell, delimitating a corresponding HDLC frame or ATM cell including the in-band control signaling using packeting and delimitation functions of HDLC or ATM;
if the link layer packet of the in-band control signaling is a Point to Point Protocol (PPP) packet, an Ethernet Media Access Control (MAC) packet or an IP packet directly, for the PPP packet, forming the frame by HDLC or GFP-F; for the IP packet, carrying the frame on PPP first, then forming the frame by HDLC or GFP-F; and for an Ethernet MAC frame, forming the frame by GFP-F.

19. The method according to claim 1, wherein the method further comprises:
forming the in-band control signaling into a GFP-F frame, GFP-F frame being the type of frame as defined by Generic Framing Procedure for supporting Protocol Data Unit (PDU);
coding the digital wireless signal data stream, and forming the coded digital wireless signal data stream into a GFP-T frame; and
GFP frame-level multiplexing the formed GFP-F frame and the formed GFP-T frame.

20. The method according to claim 19, wherein parallel to serial conversion is performed on the digital wireless signal before the digital wireless signal data stream is coded.

21. The method according to claim 19, wherein after GFP frame-level multiplexing the formed GFP-F frame and the formed GFP-T frame, the method further comprises:

mapping the GFP frame to a Virtual Container first and then to a STM-N frame by means of sequential concatenation or virtual concatenation; or mapping the GFP frame directly to an OTM-n frame using Optical Channel Data Unit (ODU).

22. The method according to claim 19, wherein the method further comprises:

extracting the GFP frame from a received STM-N/OTM-n frame; and demultiplexing the extracted GFP frame, to separate the GFP-F frame and the GFP-T frame, so as to restore the in-band control signaling from the separated GFP-F frame, and firstly decoding the separated GFP-T frame and then restoring the digital wireless signal.

23. The method according to claim 22, wherein the step of extracting the GFP frame from the received STM-N/OTM-n frame further comprises:

virtual concatenation buffering the received STM-N/OTM-n frame.

24. The method according to claim 22, wherein the method further comprises:

performing serial to parallel conversion on the decoded digital wireless signal.

25. The method according to claim 19, wherein, in order to reduce disadvantage effects on time delay in the digital wireless signal data stream transmission and its clock recovery due to a larger in-band control signaling link layer packet, the method adopts one of the following measures:

i) selecting smaller Maximum Transmission Unit to realize smaller control signaling link layer packet;

ii) transmitting first the GFP-T frame carrying the digital wireless signal data stream in the GFP frame-level multiplexing.

26. The method according to claim 1, wherein the method further comprises:

coding the in-band control signaling stream and forming a first GFP-T client data frame;

coding the digital wireless signal data stream and forming a second GFP-T client data frame;

GFP frame-level multiplexing the first GFP-T client data frame and the second GFP-T client data frame.

27. The method according to claim 26, wherein parallel to serial conversion is performed on the digital wireless signal before the digital wireless signal data stream is coded.

28. The method according to claim 26, wherein the method further comprises:

mapping the multiplexed GFP frame to a Virtual Container first and then to a STM-N frame by means of sequential concatenation or virtual concatenation; or mapping the multiplexed GFP frame directly to an OTM-n frame using Optical Channel Data Unit (ODU).

29. The method according to claim 26, wherein the method further comprises:

extracting the GFP frame from a received STM-N/OTM-n frame; and demultiplexing the extracted GFP frame, and decoding respectively the first GFP-T client data frame and the second GFP-T client data frame as they are demultiplexed, to restore the in-band control signaling and the digital wireless signal respectively.

30. The method according to claim 29, wherein the step of extracting the GFP frame from the received STM-N/OTM-n frame further comprises:

virtual concatenation buffering the received STM-N/OTM-n frame.

31. The method according to claim 29, wherein the method further comprises:

performing serial to parallel conversion on the decoded digital wireless signal.

32. The method according to claim 26, wherein the first GFP-T client data frame and the second GFP-T client data frame are GFP-level multiplexed by means of fixed allocation and by adding extension header to provide a channel identifier.

33. The method according to claim 26, wherein the method further comprises:

if the link layer packet of the in-band control signaling is a High-Level Data Link Control (HDLC) frame or an Asynchronous Transmission Mode (ATM) cell, delimitating a corresponding HDLC frame or ATM cell including the in-band control signaling using packeting and delimitation functions of HDLC or ATM;

if the link layer packet of the in-band control signaling is a Point to Point Protocol (PPP) packet, an Ethernet Media Access Control (MAC) packet or an IP packet directly, for the PPP packet, forming the frame by HDLC or GFP-F; for the IP packet, carrying the frame on PPP first, then forming the frame by HDLC or GFP-F; and for an Ethernet MAC frame, forming the frame by GFP-F.

34. The method according to claim 1, wherein:

time division multiplexing the digital wireless signal data stream and the in-band control signaling stream within one GFP-T frame;

coding the data stream after being time division multiplexed and forming a GFP-T client data frame.

35. The method according to claim 34, wherein parallel to serial conversion is performed on the digital wireless signal before the digital wireless signal data stream and the in-band control signaling are time division multiplexed.

36. The method according to claim 34, wherein the method further comprises:

mapping the GFP-T frame to a Virtual Container (VC) first and then to a STM-N frame by means of sequential concatenation or virtual concatenation; or mapping the GFP-T frame directly to an OTM-n frame using Optical Channel Data Unit (ODU).

37. The method according to claim 34, wherein the method further comprises:

extracting the GFP-T frame from a received STM-N/OTM-n frame;

decoding the extracted GFP-T frame; and demultiplexing the decoded GFP-T frame to restore the in-band control signaling and the digital wireless signal.

38. The method according to claim 37, wherein the step of extracting the GFP-T frame from the received STM-N/OTM-n frame further includes:

virtual concatenation buffering the received STM-N/OTM-n frame.

39. The method according to claim 37, wherein:

performing serial to parallel conversion on the demultiplexed digital wireless signal.

40. The method according to claim 34, wherein the method further comprises:

if the link layer packet of the in-band control signaling is a High-Level Data Link Control (HDLC) frame or an Asynchronous Transmission Mode (ATM) cell, delimitating a corresponding HDLC frame or ATM cell including the in-band control signaling using packeting and delimitation functions of HDLC or ATM;

if the link layer packet of the in-band control signaling is a Point to Point Protocol (PPP) packet, an Ethernet Media Access Control (MAC) packet or an IP packet directly, for the PPP packet, forming the frame by HDLC or GFP-F; for the IP packet, carrying the frame on PPP first, then forming the frame by HDLC or GFP-F; and for an Ethernet MAC frame, forming the frame by GFP-F.

41. The method according to claim 1, wherein the method further comprises:
coding being performed using 64B/65B code block; and
decoding being performed using 64B/65B code block correspondingly.

42. The method according to claim 1, wherein the method further comprises:
in the down link from the host BTS to the RRU:
a reference clock source in the host BTS providing a GFP framing and VC/ODU mapping module at the transmitting end of a link interface with timing; and
at the receiving end of the link interface, restoring a digital wireless signal data stream clock using Phase Locked Loop based on the occupation station of First In First Out memory, and setting the restored clock as reference frequency source of the RRU simultaneously;
in the up link from the RRU to the host BTS:
a GFP framing and VC/ODU mapping module at the transmitting end of the link interface sending data using a synchronization clock obtained in the down link;
at the receiving end of the link interface, providing a GFP frame decoding and VC/ODU demapping module with timing using said reference clock source.

43. A Base Transceiver Station (BTS) communication system of signal transmission between a host BTS and one or more Remote Radio Units (RRUs), wherein a transmission channel between the host BTS and said one or more RRU(s) communicates using wideband transmission links or a network, the BTS communication system comprises:
a Synchronous Digital Hierarchy (SDH)/Optical Transmission Network (OTN) communication interface disposed at the transmission channel, the communication interface being used to form a digital wireless signal data stream and an in-band control signaling stream transmitted over the transmission channel into a Generic Framing Procedure (GFP) frame which is further mapped to a STM-N/OTM-n frame, thereby multiplexing the digital wireless signal data stream and the in-band control signaling stream to realize SDH/OTN-based transmission.

44. The BTS communication system according to claim 43, wherein the system further, comprises:
a coding unit for coding the digital wireless signal data stream;
a client data frame framing unit for forming the coded data stream into a GFP-T client data frame, the GFP-T frame being the type of frame as defined by GFP for supporting block coding;
a client management frame (CMF) framing unit for forming the in-band control signaling stream into a GFP-T client management frame (CMF); and
a frame multiplexing unit for sending single said client management frame CMF at a gap between the formed GFP-T client data frames, to GFP frame-level multiplex the digital wireless signal data stream and the in-band control signaling stream.

45. The BTS communication system according to claim 44, wherein the system further comprises:
a parallel to serial conversion unit coupled with the coding unit, for performing parallel to serial conversion on the digital wireless signal before the digital wireless signal data stream is coded.

46. The BTS communication system according to claim 44, wherein the system further comprises:
a mapping/concatenation unit coupled with the frame multiplexing unit, for mapping the multiplexed GFP-T frame to a Virtual Container (VC) first and then to a STM-N frame by means of sequential concatenation or virtual concatenation; or mapping the multiplexed GFP-T frame directly to an OTM-n frame using Optical Channel Data Unit (ODU).

47. The BTS communication system according to claim 44, wherein the system further comprises:
a frame demultiplexing unit for extracting the GFP frame from a received STM-N/OTM-n frame, and for demultiplexing the extracted GFP frame, to separate the GFP-T client data frame and the GFP-T client management frame;
a CMF frame processing unit coupled with the demultiplexing unit, for restoring the in-band control signaling from the separated GFP-T client management frame;
a GFP-T frame processing unit coupled with the frame demultiplexing unit, for restoring the coded digital wireless signal from the separated GFP-T Client data frame; and
a decoding unit coupled with the GFP-T frame processing unit, for decoding the GFP-T client data frame to restore the digital wireless signal.

48. The BTS communication system according to claim 47, wherein the system further comprises:
a virtual concatenation buffer unit for virtual concatenation buffering the received STM-N/OTM-n frame.

49. The BTS communication system according to claim 47, wherein the system further comprises:
a serial to parallel conversion unit coupled with the decoding unit, for performing serial to parallel conversion on the decoded digital wireless signal.

50. The BTS communication system according to claim 43, wherein the system further comprises:
a coding unit for coding the digital wireless signal;
a scheduling unit coupled with the coding unit, for transmitting the in-band control signaling utilizing a control character in a code block used for coding; and
a frame forming unit for forming the digital wireless signal data stream coded by the coding unit and carrying the in-band control signaling into a GFP-T frame.

51. The BTS communication system according to claim 50, wherein the system further comprises:
a parallel to serial conversion unit coupled with the scheduling unit, for performing parallel to serial conversion on the digital wireless signal.

52. The BTS communication system according to claim 50, wherein the system further comprises:
a mapping/concatenation unit coupled with the frame forming unit, for mapping the GFP-T frame to a Virtual Container (VC) first and then to a STM-N frame by means of sequential concatenation or virtual concatenation; or mapping the GFP-T frame directly to an OTM-n frame using an Optical Channel Data Unit (ODU).

53. The BTS communication system according to claim 50, wherein the system further comprises:
a frame processing unit for extracting the GFP-T frame from a received STM-N/OTM-n frame;
a decoding unit coupled with the frame processing unit, for decoding the extracted GFP-T frame; and
a separating unit coupled with the decoding unit, for restoring the in-band control signaling and the digital wireless signal from the decoded GFP-T frame.

54. The BTS communication system according to claim 53, wherein the system further comprises:
 a virtual concatenation buffer unit for virtual concatenation buffering the received STM-N/OTM-n frame.

55. The BTS communication system according to claim 53, wherein the system further comprises:
 a serial to parallel conversion unit coupled with the decoding unit, for performing serial to parallel conversion on the restored digital wireless signal.

56. The BTS communication system according to claim 43, wherein the system further comprises:
 a first frame forming unit for forming the in-band control signaling into a GFP-F frame, the GFP-F frame being the type of the frame as defined by Generic Framing Procedure GFP for supporting Protocol Data Unit (PDU);
 a coding unit for coding the digital wireless signal data stream;
 a second frame forming unit coupled with the coding unit, for forming the coded digital wireless signal data stream into a GFP-T frame; and
 a frame multiplexing unit for GFP frame-level multiplexing the formed GFP-F frame and the formed GFP-T frame.

57. The BTS communication system according to claim 56, wherein the system further comprises:
 a parallel to serial conversion unit coupled with the coding unit, for performing parallel to serial conversion on the digital wireless signal.

58. The BTS communication system according to claim 56, wherein the system further comprises:
 a mapping/concatenation unit coupled with the frame multiplexing unit, for mapping the GFP frame to a Virtual Container (VC) first and then to a STM-N frame by means of sequential concatenation or virtual concatenation; or mapping the GFP frame directly to an OTM-n frame using Optical Channel Data Unit (ODU).

59. The BTS communication system according to claim 56, wherein the system further comprises:
 a frame demultiplexing unit for extracting the GFP frame from a received STM-N/OTM-n frame; and demultiplexing the extracted GFP frame to separate the GFP-F frame and the GFP-T frame;
 a first frame processing unit coupled with the frame demultiplexing unit, for restoring the in-band control signaling from the separated GFP-F frame;
 a second frame processing unit coupled with the frame demultiplexing unit, for outputting the coded digital wireless signal; and
 a decoding unit coupled with the second frame processing unit, for decoding the coded digital wireless signal output to restore the digital wireless signal.

60. The BTS communication system according to claim 59, wherein the system further comprises:
 a virtual concatenation buffer unit for virtual concatenation buffering the received STM-N/OTM-n frame.

61. The BTS communication system according to claim 59, wherein the system further comprises:
 a serial to parallel conversion unit coupled with the decoding unit, for performing serial to parallel conversion on the decoded digital wireless signal.

62. The BTS communication system according to claim 43, wherein the system further comprises:
 a first coding unit for coding the in-band control signaling stream;
 a first frame forming unit coupled with the first coding unit, for forming the coded in-band control signaling into a first GFP-T client data frame;
 a second coding unit for coding the digital wireless signal data stream;
 a second frame forming unit coupled with the second coding unit, for forming the coded digital wireless signal into a second GFP-T client data frame;
 a frame multiplexing unit coupled with the first frame forming unit and the second frame forming unit, for GFP-level multiplexing the first GFP-T client data frame and the second GFP-T client data frame.

63. The BTS communication system according to claim 62, wherein the system further comprises:
 a parallel to serial conversion unit coupled with the second coding unit, for performing parallel to serial conversion on the digital wireless signal.

64. The BTS communication system according to claim 62, wherein the system further comprises:
 a mapping/concatenation unit coupled with the frame multiplexing unit, for mapping the multiplexed GFP frame to a Virtual Container (VC) first and then to a STM-N frame by means of sequential concatenation or virtual concatenation; or mapping the multiplexed GFP frame directly to an OTM-n frame using Optical Channel Data Unit (ODU).

65. The BTS communication system according to claim 62, wherein the system further comprises:
 a frame demultiplexing unit for extracting the GFP frame from a received STM-N/OTM-n frame and for demultiplexing the extracted GFP frame;
 a first frame processing unit coupled with the frame demultiplexing unit, for processing the first GFP-T client data frame including the in-band control signaling;
 a first decoding unit coupled with the first frame processing unit, for decoding the output of the first frame processing unit to separate the in-band control signaling;
 a second frame processing unit coupled with the frame demultiplexing unit, for processing the second GFP-T client data frame including the digital wireless signal;
 a second decoding unit coupled the second frame processing unit, for decoding the output of the second frame processing unit to separate the digital wireless signal.

66. The BTS communication system according to claim 65, wherein the system further comprises:
 a virtual concatenation buffer unit for virtual concatenation buffering the received STM-N/OTM-n frame.

67. The BTS communication system according to claim 65, wherein the system further comprises:
 a serial to parallel conversion unit coupled with the second decoding unit, for performing serial to parallel conversion on the decoded digital wireless signal.

68. The BTS communication system according to claim 43, wherein the system further comprises:
 a Time Division Multiplex unit for time division multiplexing the digital wireless signal data stream and the in-band control signaling stream within one GFP-T frame;
 a coding unit coupled with the Time Division Multiplexing unit, for coding the data stream after being time division multiplexed; and
 a frame forming unit coupled with the coding unit, for forming the coded data stream into GFP-T client data frame.

69. The BTS communication system according to claim 68, wherein the system further comprises:
- a parallel to serial conversion unit coupled with the Time Division Multiplexing unit, for performing parallel to serial conversion on the digital wireless signal.

70. The BTS communication system according to claim 68, wherein the system further comprises:
- a mapping/concatenation unit coupled with the frame forming unit, for mapping the GFP-T frame to a Virtual Container (VC) first and then to a STM-N frame by means of sequential concatenation or virtual concatenation; or mapping the GFP-T frame directly to an OTM-n frame using Optical Channel Data Unit (ODU).

71. The BTS communication system according to claim 68, wherein the system further comprises:
- a frame processing unit for extracting the GFP-T frame from a received STM-N/OTM-n frame;
- a decoding unit for decoding the extracted GFP-T frame; and
- a demultiplexing unit for demultiplexing the decoded GFP-T frame to restore the in-band control signaling and the digital wireless signal.

72. The BTS communication system according to claim 71, wherein the system further includes comprises:
- a virtual concatenation buffer unit for virtual concatenation buffering the received STM-N/OTM-n frame.

73. The BTS communication system according to claim 71, wherein the system further includes comprises:
- a serial to parallel conversion unit coupled with the demultiplexing unit, for performing serial to parallel conversion on the demultiplexed digital wireless signal.

74. The BTS communication system according to claim 43, wherein,
- a coding unit performing coding using 64B/65B code block; and
- a decoding unit performing decoding using 64B/65B code block correspondingly.

75. The BTS communication system according to claim 43, wherein the host BTS includes a BTS reference clock source, and the RRU includes a clock recovery Phase Locked Loop, wherein:
  in the down link from the host BTS to the RRU:
  the reference clock source in the host BTS for providing a GFP framing and VC/ODU mapping module at the transmitting end of a link interface with timing; and
  the clock recovery Phase Locked Loop, at the receiving end of the link interface, for restoring a digital wireless signal data stream clock and for setting the restored clock as reference frequency source of the RRU, the clock recovery Phase Locked Loop being the Phase Locked Loop based on the occupation station of First In First Out memory;
  in the up link from the RRU to the host BTS:
  the clock recovery Phase Locked Loop for providing a GFP framing and VC/ODU mapping module at the transmitting end of the link interface with a synchronization clock obtained in the down link to send data;
  the reference clock source in the host BTS for providing a GFP frame decoding and VC/ODU demapping module at the receiving end of the link interface with timing.

* * * * *